3,228,782
SHELLAC-ISOCYANATE COMPOSITIONS
Irving Skeist, Summit, N.J., Rock F. Martel, Stamford,
Conn., and Werner R. Kuebler, Ho-Ho-Kus, N.J., assignors to Gillespie-Rogers-Pyatt Co., Inc., New York,
N.Y., a corporation of Delaware
No Drawing. Filed Nov. 2, 1962, Ser. No. 235,138
17 Claims. (Cl. 106—236)

This invention relates to certain compositions of shellac and organic isocyanates. In particular, this invention relates to stable coating compositions prepared from shellac and organic isocyanates which are applied to a substrate as ordinary coating vehicles and require no heat curing of the coated surface; this invention also relates to certain shellac-organic isocyanate foam compositions.

The reactivity of the isocyanate radical with compounds containing labile hydrogen is known. For example, organic polyisocyanates react with polyols to form compositions useful for surface coatings. In the preparation of these compositions a polyol is reacted with the polyisocyanate to give a cross-linked structure.

Shellac is a natural resin having several free hydroxyl groups. Moreover, the shellac molecule has other reactive groups such as carboxy. Shellac will also form cross-linked structures with itself on continued heating.

In order to form from polyols cross-linked products which are resistant to heat and to solvents, it is necessary to use an organic isocyanate with more than one isocyanate group on the molecule. With shellac, however, which has other types of labile hydrogen besides hydroxyl, and which under certain conditions can form cross-linked structures with itself, organic monoisocyanates may also be used. Using monoisocyanates, the cross-linking reaction takes place only through the functional group originally present in the shellac molecule. On the other hand, when polyisocyanates are used, a cross-linking reaction may take place between the shellac and the polyisocyanate, or between two shellac molecules, or both, depending on the reaction conditions. Thus the products made from shellac are necessarily different from the polyurethanes prepared from organic polyisocyanates and the usual polyols due to the difference in chemical structure of the cross-linked product.

According to our invention stable coating compositions are prepared by reacting an anhydrous solution of shellac with an organic isocyanate.

If less than the stoichiometric ratios of the isocyanate to the shellac are used, the product is a modified shellac with improved properties. These compositions cure by interaction of the ingredients. After reaction is complete the stable composition can be marketed as a one-package composition which is applied to a surface as ordinary coating vehicles and requires no heat curing. A stabilizer may be added to remove the last traces of isocyanate.

If greater than stoichiometric ratios of the isocyanate to the shellac are used, the product is cured not only by the interaction of the ingredients, but after application to a surface and evaporation of the solvent, the low molecular weight isocyanate-terminated intermediate cures by reacting with moisture in the air. In such compositions the solvent-soluble intermediate containing the terminal isocyanate groups is known as a "prepolymer." The prepolymer can be marketed as a one-package composition.

If desired, addition agents can be added to the above compositions in order to give a wide range of useful properties.

There is a basic distinction in the structure of (1) the products which are cured by reaction of isocyanates with a polyol and (2) the products which are cured by the reaction of isocyanates with moisture. In the former case the reaction of the two components takes place to give a stable urethane:

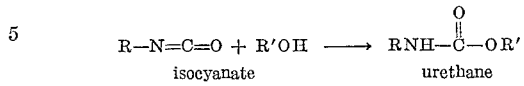

When there are two or more isocyanate groups on one molecule and two or more hydroxyl, or other active groups, on the other molecule, a cross linking occurs between the two types of molecules. When one of the reactants is at least difunctional, and the other is at least trifunctional, cross linking can occur between the two types of molecules. Even when both reactants are difunctional, if the isocyanate is present in excess, the urethane groups may react with the excess isocyanate to form allophanate cross linkages.

When organic isocyanates are cured by moisture the reaction is:

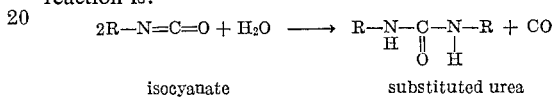

Thus two molecules of the organic isocyanate are condensed with the elimination of $CO_2$. The carbon dioxide formed rapidly diffuses through the film, and bubble-free coatings result from properly formulated systems.

Application of the coatings is by conventional brush, spray, or dip methods. Their viscosity may be adjusted by dilution with appropriate solvents. The one-package coating is more convenient to use, since the measurement and blending of a second component is not required.

It is an advantage of this invention that heat is not required for a curing process after the coating is applied. Heating to a higher temperature is frequently impossible due to various reasons such as the shape and dimensions or due to the adverse effects of high temperatures on the object which preclude placing the object in an oven.

The first step in the preparation of the coatings of our invention is to prepare an anhydrous solution of shellac in a solvent which is inert to shellac and to organic isocyanates. Any inert solvent, or mixture of solvents, may be used that will afford clear solutions of shellac which can be made anhydrous, which will have physical characteristics suitable for coatings, especially with regard to viscosity, and which are sufficiently stable that the shellac will not reprecipitate on standing at room temperature. The preferred solvents for our invention are methyl ethyl ketone, cyclohexanone, and mixture of the two. Dioxane can also be employed.

Shellac dissolves in hot methyl ethyl ketone, but at some concentrations the shellac tends to reprecipitate on standing at room temperature. Cyclohexanone dissolves shellac at 90° C., giving crystal clear shellac solution which remains stable on cooling. The addition of only about 5 parts of cyclohexanone to about 95 parts of methyl ethyl ketone results in a stable shellac solution and this is a preferred solvent mixture for shellac-isocyanate coatings. Other mixtures of cyclohexanone and methyl ethyl ketone can also be used.

Any instability of shellac in methyl ethyl ketone can also be overcome by the incorporation of certain polyols. Although 30 parts of shellac is soluble in 70 parts of Pluracol TP-440 (a 400 molecular weight product made by the addition of propylene oxide to trimethylolpropane) to give a stable solution, the use of lesser amounts of Pluracol produces a more viscous solution which, although clear, requires high temperatures for fluidity. It is important that the shellac solution be made anhydrous due to the reaction of water with isocyanates. The amount of water in a shellac solution can be reduced to less than about 0.02% by having present another liquid as a carrier for the water vapor, which liquid will not boil at too high a temperature, so that on distillation the shellac will not lose plasticity through a heat activated reaction. The preferred liquids are those which form lower boiling azeotropes with water, such as benzene, toluene, xylene, ethylbenzene, and aliphatic hydrocarbons, from $C_5$ to $C_{10}$. Using toluene, for example, the shellac is dissolved in a solvent such as methyl ethyl ketone (or a mixture of methyl ethyl ketone and cyclohexanone), toluene is added, and the mixture is then distilled, the water being carried off with the first distillate in the form of a toluene-water azeotrope. This is the preferred method for obtaining anhydrous shellac solutions for the compositions of our invention, and especially for those compositions in which an excess of isocyanate is used.

When less than stoichiometric ratios of the isocyanate to shellac hydroxyl are used the organic isocyanate is added to the anhydrous shellac solution while maintaining the mixture at a controlled temperature. The isocyanate is preferably added slowly to the anhydrous shellac solution since an exothermic reaction ensues and best results are obtained by controlling the reaction temperature. After the exothermic reaction has subsided, the reaction mixture may be heated for a time until the reaction goes substantially to completion and the desired physical properties are obtained. Temperatures range from room temperature up to about 80° C. Above 80° C. the shellac may lose plasticity through a heat activated reaction. The reaction time may vary from a few minutes up to several hours. The resulting coatings are stable on standing.

In some compositions, it may not be practical to react the last traces of isocyanate. These compositions are improved by stabilization to eliminate the last traces of isocyanate which otherwise will continue to react, bringing about an increase in viscosity, or gelation, on standing. By eliminating final traces of diisocyanates by adding a reactive monofunctional compound containing active hydrogen, the stability of the system is assured. A monohydric aliphatic alcohol such as methyl alcohol or octyl alcohol is the preferred stabilizing agent. Other compounds having active hydrogen, for example, monocarboxylic acids and monoamines can also be used for this purpose. The preferred —NCO/—OH ratios for the methanol-stabilized compositions are from 0.8 to 1.05.

A unique one-package coating composition is prepared by reacting about 3 parts of shellac with 1 part of toluene diisocyanate in an anhydrous methyl ethyl ketone solution, and then adding methyl alcohol. The methanol stabilizes the system by reacting with any trace of toluene diisocyanate which has survived the reaction with shellac. Applied to wood and glass, this modified shellac is far superior to shellac alone in gloss, water resistance, hardness and resistance to salt solution.

The toughness of shellac coatings is improved by reacting the shellac with monoisocyanates.

The coatings of our invention have reduced water sensitivity as compared with the usual shellac coatings. The sensitivity to water has been reduced not only by converting the hydroxy groups of the shellac to urethane groups, but also by adding an aromatic group or fatty acid radical which is in itself hydrophobic. The coatings also have excellent abrasion resistance, are durable to exposure, and resistant to chemicals and many solvents. They are especially useful for coating leather and as mirror backings. The shellac isocyanate products have many other uses for example, as a stiffening or waterproofing agent for hats, and for treating textile material and papers to improve water resistance and water repellency.

When higher than stoichiometric ratios of the isocyanate to the shellac hydroxyl are used, the composition is prepared by adding the organic isocyanate to the anhydrous shellac solution, preferably maintaining the mixture at a raised temperature. The resulting compositions are stable on storage. After applying to a surface the solvent evaporates and the film cures by exposure to moisture in the air.

When higher than stoichiometric ratios of the isocyanate to shellac hydroxyl are used the ingredients of the composition may also be mixed just prior to use and then applied as a coating. Cure takes place rapidly at room temperatures, and more rapidly at higher temperatures.

When coated on wood these products show excellent gloss, and resistance to water, alkali, detergent and alcohol. A coating on glass plate shows excellent adhesion and water resistance and is unaffected by salt solution at room temperature or spray at 100° C. It is useful as a mirror backing.

The optimum product is prepared by using the reactants in approximately 1.2/1.0 equivalent ratio of the isocyanate to the shellac hydroxyl. Greater amounts of isocyanate up to about ten times the equivalent ratio may be employed. However, there is a practical limit which must be observed if gelation is to be avoided. These limits will vary with the particular organic isocyanate employed.

The reactivity of organic isocyanates with shellac is influenced by the pH of the system. Bases act as catalysts. Catalysts which are particularly suitable include tertiary amines, such as pyridine, N-ethylmorpholine, and triethylamine; also the commercial product "Dabco," which is triethylenediamine. Other catalysts include tin compounds such as stannous octoate, stannous soaps and dialkyl tin carboxylates. These metal catalysts may be used in combination with amine bases. When aliphatic isocyanate are used, catalysts are generally added since aliphatic isocyanates are, in general, less reactive than aromatic isocyanates.

Acids have an inhibiting effect on the reaction of shellac with organic isocyanates. At the lower levels of acidity encountered in the components of the shellac coatings of our invention, minor variations generally have no effect on the polymerization reaction when the recommended reaction temperatures are employed.

Dewaxed, decolorized shellac may be considered as representative of "pure" shellac resin, and is used in the examples unless otherwise indicated. Other types of shellac may be employed. Natural shellac contains wax, red coloring matter and moisture. Generally, when the natural resin is used the solution of the shellac in the solvent can be decanted off from the wax which settles out. Orange shellac is unbleached shellac which may be in the form of flakes, sheets, buttons and the like. It may be employed in any formulations where the color is unobjectionable.

A wide variety of organic isocyanates may be employed, ranging from simple monoisocyanate compounds up to polymeric materials containing isocyanate groups. Examples of isocyanate compounds include the monoisocyanates, such as the alkyl isocyanates; ethyl isocyanate, butyl isocyanate and octadecyl isocyanate; the aryl monoisocyanates; such as phenyl isocyanate, α-naphthyl isocyanate, and the like; the diisocyanates, such as the polymethylene diisocyanates, for example ethylene diisocyanate, trimethylene diisocyanate, 2-chlorotrimethylene diisocyanate, tetramethylene diisocyanate, pentamethylene diisocyanate, and hexamethylene diisocyanate; alkylene diisocyanates, for instance propylene-1,3-diisocyanate, butylene-1,2-diisocyanate and butylene-1,3-diisocyanate; alkylidene diisocyanates, such as ethylidene diisocyanate and heptylidene diisocyanate, cycloalkylene diisocyanates, for example, cyclopentylene-1,3-diisocyanate, cyclohexylene-1,4-diisocyanate and cyclohexylene-1,2-diisocyanate; cycloalkane diisocyanates, for instance cyclohexane-1,4-diisocyanate; and 1,8-diisocyano-p-menthane, dicyclohexylmethane diisocyanate; aromatic diisocyanates, for instance methylene bis(p-phenylene isocyanate) which is known as "MDI" and polymethylene polyphenylisocyanate ("PAPI"); p-phenylene diisocyanate, 1-methylphenylene-2,4-diisocyanate, naphthylene-1,4-diisocyanate, 2,6-toluene diisocyanate, 2,4-toluene diisocyanate, xylene-1,3- diisocyanate, 4,4'-diphenylene methane diisocyanate, 4,4'-diphenylenepropane diisocyanate, benzidine diisocyanate, tolidine diisocyanate, and the like; corresponding tri, tetra, etc. isocyanates, such as 1,2,4-benzene triisocyanate, triphenylmethane triisocyanate, diphenylmethane tetraisocyanate, and the like. The aromatic nucleus of an aryl isocyanate is preferably the benzene ring. The aromatic ring may be substituted with groups which are non-reactive with isocyanate groups, such as alkyl or halogen. For simplicity, the term "isocyanate" is used throughout this specification to mean organic isocyanates.

The toluene diisocyanate referred to in the discussion and in the examples is an 80/20 mixture of 2,4-toluene diisocyanate and 2,6-toluene diisocyanate. This mixture is generally the preferred reactant because of its low cost. The 2,4-isomer may be used if lower viscosity materials are desired. The 80/20 isomeric mixture is the product naturally resulting from the dinitrating of toluene, reducing this product to the diamine, and then treating it with phosgene.

Superior coatings utilizing shellac as a basic material are prepared by incorporating other reactive organic materials. For example, polyols with less functionality than shellac may be added to increase flexibility and toughness, or to impart other special properties, such as gloss or adhesion. Addition agents which have been found to be particularly useful for this purpose are the polyoxyalkylene condensate polyols which are commercially available from the reaction of a variety of polyols with alkylene oxides, especially propylene oxide and ethylene oxide. Typical of these base chemicals are the diols, diethylene glycol, propylene glycols; triols such as glycerine, tri methylolpropane and hexanetriol-1,2,6, as well as polyols such as sorbitol, pentaerythritol, methyl glucoside, sucrose and tetra (hydroxypropyl) ethylenediamine.

Polyether-polyols are known under various trade names such as Pluracol, Pluronic and NIAX. In the Examples, "Pluracol TP-440" is a 400 molecular weight product which is made by the addition of propylene oxide to trimethylolpropane; "Pluronic L-61" is a diol of equivalent weight 1000 having terminal primary hydroxyl groups, which contains the sequence polyethylene oxide-polypropylene oxide-polyethylene oxide; NIAX 2025 is a polypropylene diol of the above described type. Polyester-polyols are also useful as addition agents for the compositions of this invention. Polyols of moderately high molecular weight are made by the reaction of low molecular weight polyols, in excess of stoichiometric amounts, with dibasic acids. A typical polyester-diol of this type is prepared by esterifying adipic acid with a slight excess of ethylene glycol.

The particular polyol used in a given formulation may be varied to suit a special use. Combinations of polyols may be employed. Thus a wide selection and combination of properties may be obtained by the addition of comparatively low cost polyols in the shellac-isocyanate coatings. The outstanding properties of these coatings are a combination of hardness and flexibility, abrasion resistance, and good water and chemical resistance. Excellent weather resistance is found in many of the coatings.

It is an advantage that the polyol can serve also, wholly or in part, as a solvent for the shellac, making unnecessary the addition of other shellac solvents, such as methyl ethyl ketone. Thus polyols can be used to afford a solvent-free system which can be used for castings as well as coatings.

In the two-component systems the hardest films are produced with curing polyols containing tertiary amine nitrogen, such as Quadrol which is N,N,N',N'-tetrakis(2-hydroxypropyl)ethylene diamine. Without being restricted to any theory of action it is possible that these basic polyols also serve as basic catalysts for the reaction of the shellac and the isocyanate. Dipropylene glycol, having a low equivalent weight, also contributes to film hardness. Maximum solvent resistance is obtained by the use of polyols containing tertiary amine nitrogen as curing agents. The same materials also cure most rapidly and may be considered particularly suitable for production line operations. Systems pigmented for example, with titanium oxide, red iron oxide, ferrite yellow, and the like may be prepared by ball milling the pigment with the polyol.

Compositions containing color may also be prepared by dissolving a soluble dyestuff, previously dried to remove moisture, in the solvent which is used for dissolving the shellac.

Shellac also reacts with organic isocyanates to form urethane foams. These foams are made by pre-reacting shellac with an excess of an organic isocyanate, for example, toluene diisocyanate, anhydrous, or in the presence of small fixed quantities of water to form a prepolymer. Then water in the presence of an activator solution reacts with the excess isocyanate groups of the prepolymer to form the foam.

By the use of catalysts such as dialkyl tin dicarboxylates or stannous soaps, alone or in combination with triethylenediamine or other strong tertiary amine catalysts, one-shot flexible foam formulations can also be made. A slight stoichiometric excess of cyanate over hydroxyl tends to drive the reaction to completion and eliminates unreacted hydroxyl groups. A preferred NCO/OH ratio is 1.05.

The formulations are based upon two chemical reactions which utilize the polyisocyanate groups, as described above. The structure of the foam is produced essentially by the reaction of the hydroxy-rich shellac with the isocyanate, while the reaction of the latter with water produces carbon dioxide gas to expend this developing structure. Low-boiling inert liquids, in particular fluorocarbons such as trichlorofluoromethane (commercial products known as "Fluorocarbon 11," "Freon 11" and "Genetron 11") can be successfully used as an alternate or supplementary method of physically expanding the growing structure by gas-producing vaporization of these liquids. Rigid foams result from procedures which increase the cross-linking, or which shorten the distance between the cross-linking.

The use of the polyols in these shellac based foams permit the inclusion of extenders with the forming ingredients prior to foaming. The viscosities of these polyols make it possible to use high loadings of materials such as aluminum silicate pigments, resulting in substantial cost reduction and improvement of various properties. Among the most suitable extenders are the aluminum silicate pigments, and purified kaolinite. They are readily wet by polyethers, impart thixotropy and suspend well. The extender is useful to increase the volume of the resin producing the foam. It also increases the rigidity of the resin, thus increasing the deflection value. Less shrinkage in postcuring also produces greater volume yields.

The following are examples that serve to illustrate but do not limit our invention. In the following examples the hydroxyl equivalent of shellac has been taken as 225, but it must be understood that shellac, being a natural product, may have a greater or lesser hydroxyl equivalent weight depending on its origin or its processing history.

*Example 1*

|  |  | Phs.[1] | Equivalents |
|---|---|---|---|
| Shellac | 12 grams | 74.5 | 0.053 |
| Mixture of 95% methyl ethyl ketone, 5% cyclohexanone. | 60 ml |  |  |
| Toluene diisocyanate | 4.14 grams | 25.6 | 0.047 |
| —NCO/—OH | 0.9/1.0 |  |  |

[1] Parts per hundred solids.

The shellac is dissolved in the dry methyl ethyl ketone-cyclohexanone mixture at about 75° C. The temperature of the shellac solution is cooled to about 55° C. and then the toluene diisocyanate is added slowly. After the exothermic reaction has subsided, the temperature of the reaction is increased to 80° C. and maintained there until the required viscosity develops. The temperature is then reduced to 50–55° C. The resultant material is coated on wood and cured at room temperature. The resultant coating has good gloss and is resistant to water, saturated salt spray and boiling saturated salt spray. The adhesion is good.

If desired, about 5 ml. of methyl alcohol is added to stabilize the composition.

In accordance with the above procedures, but using an equivalent quantity of "MDI," methylene bis(phenyl isocyanate), in place of the toluene diisocyanate in the above formulation, good water-resistant coatings are obtained.

*Example 2*

|  | Phs.[1] |  | Equivalents |
|---|---|---|---|
| Shellac | 4.0 grams | 87 | 0.0160 |
| Pluracol TP-440 | 0.5 grams | 10.9 | 0.0033 |
|  |  |  | [2] 0.0193 |
| Methyl ethyl ketone | 10.0 grams | 218 |  |
| Toluene diisocyanate | 0.09 grams | 2.0 | 0.0001 |
| —NCO/—OH ratio | 0.05/1.0 |  |  |

[1] Parts per hundred solids.
[2] Total.

The shellac is dissolved in a mixture of methyl ethyl ketone and Pluracol to form a homogeneous solution at 60° C. The toluene diisocyanate is then added. The resulting product is coated on oak wood.

Complete reaction of the isocyanate is brought about by using a stoichiometric ratio of isocyanate to hydroxyl of less than one. If the isocyanate ratio is greater than 1.1/1.0 during storage, the remaining isocyanate groups will continue to react, causing increase in viscosity and perhaps gelation. The coating is superior to shellac alone in gloss, water resistance, hardness, resistance to salt solution, alkali and detergent, as well as stability in methyl ethyl ketone solution. Increasing the isocyanate ratio results in increased water resistance and increased toughness.

*Example 3*

|  | Phs.[1] |  | Equivalents |
|---|---|---|---|
| Shellac | 4 grams | 53 | 0.0177 |
| Pluronic L-61 | 2 grams | 26.5 | 0.0020 |
|  |  |  | 0.0197 |
| Methyl ethyl ketone | 20 ml |  |  |
| Toluene diisocyanate | 1.54 grams | 20.4 | 0.0177 |
| —NCO/—OH | 0.9/1.0 |  |  |
| Methyl alcohol | 5 ml |  |  |

[1] Parts per hundred solids.

The shellac is dissolved in methyl ethyl ketone. The toluene diisocyanate is mixed with the Pluronic L-61, and the adduct at a temperature of 55° C. is added to the shellac solution. The reaction mixture is then heated to 80° C. for about an hour after the exothermic reaction has subsided. The methyl alcohol is then added to stabilize the product. The composition is coated on leather and cured at room temperature. The coating is superior to shellac in flexibility and resistance to water, alkali or detergents.

In accordance with the above procedures, but using an equivalent quantity of "PAPI" (polymethylene polyphenylisocyanate) in place of the toluene diisocyanate, coatings are obtained which are superior to shellac in flexibility and water resistance.

*Example 4*

|  | Phs.[1] | Equivalents |
|---|---|---|
| Shellac | 15 grams | 46.1 | 0.067 |
| Methyl ethyl ketone | 150 ml | 460 |  |
| Toluene | 10 ml | 30 |  |
| Toluene diisocyanate | 17.5 grams | 53.9 | 0.201 |
| —NCO/—OH | 3.0 |  |  |

[1] Parts per hundred solids.

The shellac is added to a mixture of the methyl ethyl ketone and toluene. The mixture is then heated to boiling and a volume of the toluene/water azeotrope is distilled off equal to the volume of toluene originally added. Then it is cooled to below 52° C. and the toluene diisocyanate is charged with agitation at such a rate that the temperature of the reaction mass does not exceed 52° C. The product is coated on a glass plate and cured at room temperature. The coating has good gloss, water resistance, resistance to saturated salt spray, resistance to boiling saturated salt spray, and good adhesion.

In accordance with the above procedure, but using an equivalent quantity of methylene bis(phenyl isocyanate) (known in the trade as "MDI"), in place of the toluene diisocyanate in the above formulation, a coating is obtained which has good gloss and water resistance.

*Example 5*

|  | Phs.[1] | Equivalents |
|---|---|---|
| Shellac | 15 grams | 41.3 | 0.067 |
| NIAX 2025 | 3 grams | 8.25 | 0.005 |
| Methyl ethyl ketone plus 0.25% dye [2] | 150 ml | 410 |  |
| Toluene | 10 ml | 28.0 |  |
| Toluene diisocyanate | 18.3 grams | 50.4 | 0.210 |
| —NCO/—OH | 3.0/1.0 |  |  |

[1] Parts per hundred solids.
[2] The dye is Colliton Fast Black BTNA.FS.

The shellac is added to a reaction flask containing the methyl ethyl ketone and toluene. The mixture is heated to boiling, and a volume of toluene/water azeotrope is distilled off equal to the volume of the toluene originally added. The toluene diisocyanate is mixed with the NIAX 2025 and this mixture is then added to the reaction flask containing the anhydrous shellac solution at 45° C. The product is applied to leather and cured by reaction with moisture from the air.

In accordance with the above procedure, but using an equivalent quantity of "PAPI" (polymethylene polyphenylisocyanate) in place of the toluene diisocyanate, good leather coatings are obtained.

*Example 6*

|  | Phs.[1] | Equivalents |
|---|---|---|
| Shellac | 20 grams | 35.8 | 0.089 |
| Methyl ethyl ketone plus 0.25% dye [2] | 100 ml |  | } 0.099 |
| Toluene | 10.0 ml |  |  |
| Pluronic L-61 | 10.0 grams | 17.9 | 0.010 |
| Toluene diisocyanate | 25.8 grams | 46.2 | 0.297 |
| —NCO/—OH | 3.0/1.0 |  |  |

[1] Parts per hundred solids.
[2] Dye is Colliton Fast Black BTNA.FS.

Twenty grams of shellac are charged into a reaction flask containing 100 ml. of methyl ethyl ketone with 0.25% dye, and 10.0 ml. of toluene. Toluene and any water present are removed by azeotropic distillation. The reaction flask is then cooled to 55° C. Ten grams of Pluronic L-61 are added slowly to 25.8 grams of toluene diisocyanate and this mixture is added slowly to the solution of shellac. When the initial exothermic reaction subsides, the reaction flask is heated to 88° C. for about three hours. The product is coated on leather and cured by reaction with moisture from the air. The resulting coating has good water resistance, flexibility and gloss.

Example 7

Two grams of shellac (50 parts) is added to one gram of Pluracol TP–440 (25 parts) and the resulting mixture is heated to about 110° C. to dissolve the shellac completely. 1.5 grams (35 parts) of toluene diisocyanate is poured into the hot (55° C.) shellac-Pluracol solution. The resulting product is spread on a glass slide and kept in an oven at 90° C. for forty-five minutes. In this formulation the —NCO/—OH ratio of 1.2 can be varied from 1.1 to 5 and the Pluracol/shellac ratio can also be progressively varied from 70:30 to 30:70.

The shellac-Pluracol solution, although clear, requires high temperatures for fluidity in order to work with the low concentrations of Pluracol. The films are much tougher than with shellac/toluene/diisocyanate formulations alone. Longer times of curing are required with larger ratios of Pluracol/shellac.

Example 8

One gram of shellac (50 parts), 0.5 gram of Pluracol TP–440 (25 parts), 50 grams of NIAX 2025 (25 parts), are stirred and heated in a 50 ml. beaker emersed in a glycerine bath at 90–95° C. Heating is continued for about fifteen minutes. When the resulting mixture is less viscous and apparently homogeneous, the beaker is removed from the glycerine bath and cooled off to about 35° C. Then 0.8 gram (40 parts) of toluene diisocyanate is poured into the beaker. The resulting product is stirred and coated on a glass slide and cured in an oven at about 90° C. for forty-five minutes. These formulations give flexible and fair strength films, and show that the flexibility is a function of the amount of the NIAX. The films show good water resistance at room temperature, and clarity is not affected by boiling.

In the above procedure the NIAX/Pluracol ratio of 1:1 was increased to 2:1 with good results.

Example 9

One gram (50 parts) of shellac is mixed with 0.5 gram (25 parts) of Pluracol TP–440 and 1.0 ml. of methyl ethyl ketone and the mixture is heated to about 75° C. to dissolve the shellac completely. 0.5 gram of hot NIAX 2025 is poured into this solution with constant stirring. 0.8 gram of toluene diisocyanate is then added at room temperature. The resulting product is spread on a glass slide and cured at about 90° C. in an oven for a minimum of ten minutes. These formulations give easier workability, stability of solution and fluidity at room temperature.

Example 10

Four grams of shellac is dissolved in 20 ml. of dry methyl ethyl ketone by heating at about 70° C. in a reaction flask. When all the shellac is in solution, 6.0 grams of toluene diisocyanate is poured into the reaction flask. The reaction temperature is maintained at about 55° C. for an hour. The prepolymer is then precipitated by adding the above solution to dry toluene. The drying of this prepolymer is carried out in a vacuum desiccator over calcium chloride. The prepolymer is cured in air to form a tough water resistant film.

Example 11

Twenty-five grams of bleached, refined, and dried shellac, 15.7 grams of phenyl isocyanate and 122.3 ml. of methyl ethyl ketone are heated to 60° C. for 4 hours. The reaction product is cooled to room temperature and then filtered, if necessary. The composition is coated on a wood or metal surface, and the solvent is allowed to evaporate to form a film which has greater hardness and less water permeability than untreated shellac films.

Example 12

Thirty grams (one equivalent) of bleached, refined, and dried shellac is dissolved by warming in 114 grams of dioxane which has been purified by passing through an alumina column and distillation with sodium. The solution is cooled to room temperature and then 18.9 grams (one equivalent) of phenyl isocyanate, and then 4 drops of triethylamine are separately added and mixed by swirling. The solution is allowed to stand overnight without stirring in a reaction flask which is fitted with a drying tube. Any precipitate of diphenylurea which has formed from the phenyl isocyanate due to the presence of water in the system is filtered off and phenyl isocyanate is added to the solution in an amount based on the weight of the precipitate. The composition is coated on a wood or metal surface. The film has greater water repellency and hardness than shellac coatings.

Example 13

Twenty-five grams of bleached, refined, and dried shellac, 22.7 grams of alpha-naphthyl isocyanate and 142 grams of methyl ethyl ketone are heated at a temperature of 20° to 60° C. for about 4 hours and then 100 ml. of dimethylformamide is added. The reaction product is cooled to room temperature and filtered, if necessary. The composition is applied to wood to afford a water resistant coating.

Example 14

Twenty-five grams of bleached, refined, and dried shellac, 38.5 grams of octadecyl isocyanate, and 190.5 ml. of methyl ethyl ketone are allowed to react at a temperature of 20° to 60° C. for about 4 hours, and then 48 ml. of dimethylformamide is added. The product is filtered, if necessary, and the composition is coated on a wood or metal surface to give a coating in which the water permeability is much improved as compared with shellac coatings.

Example 15

Thirty grams (one equivalent) of bleached, refined, and dried shellac is dissolved by warming in 179 grams of dioxane which has been purified by passing through an alumina column and distillation with sodium. The solution is cooled to room temperature and then 47.8 grams (one equivalent) of octadecyl isocyanate, and then 4 drops of triethylamine are separately added and mixed by swirling. The solution is allowed to stand overnight without stirring in a reaction flask which is fitted with a drying tube. The composition is applied to wood or metal to give a tough, water resistant coating.

Example 16

A shellac-toluene diisocyanate foam composition is prepared in the following manner: Triethylenediamine (0.5 part) is dissolved in 2 parts of water and mixed with Silicone L–520 (0.5 part). This mixture is added to 100 parts of a 30% solution of shellac in Pluracol TP–440 which has been stirred at 35–40° C. for one minute in a paper cup; the mixture is then stirred for about 3 minutes longer. Toluene diisocyanate (49 parts) is then added to the mixture and the stirring continued for about 5 seconds. A silicone-coated paper chimney is placed over the paper cup which extends over the cup about 8 to 12 inches. Foam begins to rise immediately and sets hard in about two hours. An exothermic reaction is observed. The stirring motor is set at 45 r.p.m.

The above foam shows improved electrical properties in insulating electrical systems by in situ foaming operations.

While certain representative embodiments and details have been shown for the purpose of illustrating the invention, it will be apparent to those skilled in the art that various changes and modifications may be made

We claim:
1. A coating composition that is stable at ambient temperatures which consists essentially of
   (a) an anhydrous solvent which is inert to organic isocyanates, and
   (b) the product formed by reacting an organic isocyanate with a solution of shellac in said anhydrous solvent while maintaining the temperature within the range of about 20° to 80° C.
2. The coating composition of claim 1 wherein said solvent is selected from the group consisting of dioxane, methyl ethyl ketone, cyclohexanone, and mixtures of methyl ethyl ketone and cyclohexanone.
3. The coating composition of claim 2 wherein said solvent is a mixture of approximately 95% methyl ethyl ketone and 5% cyclohexanone.
4. The coating composition of claim 1 wherein said organic isocyanate is substantially in stoichiometric proportion with respect to the hydroxyl content of the shellac.
5. The coating composition of claim 1 wherein said organic isocyanate is an aromatic isocyanate containing at least two isocyanate groups.
6. The coating composition of claim 1 wherein said organic isocyanate is selected from the group consisting of 2,4-toluenediisocyanate, 2,6-toluenediisocyanate, and mixtures thereof.
7. The coating composition of claim 1 wherein said organic isocyanate is methylene bis(p-phenylene isocyanate).
8. The coating composition of claim 1 wherein said organic isocyanate is polymethylene polyphenylisocyanate.
9. A process for preparing a coating composition which is stable at ambient temperatures which comprises
   (a) preparing an anhydrous solution of shellac in a solvent which is inert to organic isocyanates, and
   (b) admixing an organic isocyanate with said shellac solution while maintaining the temperature of the composition within the range of about 20° to 80° C. for a time sufficient to give a consistency suitable for a coating composition.
10. The process of claim 9 wherein said anhydrous solution of shellac in step (a) is prepared by warming at a temperature from about 55° to 80° C., for a time ranging from a few minutes to a few hours, and then cooling to ambient temperature.
11. The process of claim 9 wherein said anhydrous solution of shellac in step (a) is prepared by adding a minor amount of a hydrocarbon which forms a lower boiling azeotrope with water, and distilling off the hydrocarbon/water azeotrope at a temperature below about 80° C.
12. The process of claim 11 wherein said solvent is methyl ethyl ketone and said hydrocarbon is toluene.
13. The process of claim 9 wherein said solvent is selected from the group consisting of dioxane, methyl ethyl ketone, cyclohexanone, and mixtures of methyl ethyl ketone and cyclohexanone.
14. The process of claim 9 wherein said organic isocyanate is selected from the group consisting of 2,4-toluenediisocyanate, 2,6-toluenediisocyanate, and mixtures thereof.
15. The process of claim 9 wherein said organic isocyanate is methylene bis(p-phenylene isocyanate).
16. The process of claim 9 wherein said organic isocyanate is polymethylene polyphenylisocyanate.
17. The coating composition of claim 1 wherein the stoichiometric amounts of isocyanate/shellac hydroxyl lie within the range of 1/3 to 10/1.

References Cited by the Examiner

UNITED STATES PATENTS

| | | |
|---|---|---|
| 2,853,397 | 9/1958 | Seibert et al. _____ 106—237 |
| 3,030,249 | 4/1962 | Schollenberger et al. __ 260—2.5 |
| 3,061,557 | 10/1962 | Hostettler et al. _____ 260—97 |

ALEXANDER H. BRODMERKEL, *Primary Examiner.*

D. J. ARNOLD, *Assistant Examiner.*